United States Patent
Castor et al.

(10) Patent No.: US 7,813,312 B2
(45) Date of Patent: Oct. 12, 2010

(54) METHOD AND SYSTEM FOR PREVENTING HIGH SPEED DOWNLINK PACKET ACCESS TRANSMISSIONS LOSS

(75) Inventors: Douglas R. Castor, Norristown, PA (US); Gregory S. Sternberg, Mt. Laurel, NJ (US); John Mathisen McNally, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1141 days.

(21) Appl. No.: 11/202,588

(22) Filed: Aug. 12, 2005

(65) Prior Publication Data

US 2006/0251014 A1    Nov. 9, 2006

Related U.S. Application Data

(60) Provisional application No. 60/678,526, filed on May 6, 2005.

(51) Int. Cl.
    *H04W 4/00* (2009.01)
(52) U.S. Cl. ................ 370/328; 370/338; 455/437; 455/434; 455/442
(58) Field of Classification Search ............ 455/437, 455/434, 442; 370/338, 328
    See application file for complete search history.

(56) References Cited

U.S. PATENT DOCUMENTS

| 7,016,320 | B1 * | 3/2006 | Petersson et al. ............ 370/331 |
| 7,046,650 | B2 * | 5/2006 | Sherman ................... 370/338 |
| 7,496,048 | B2 * | 2/2009 | Ikeda et al. ................ 370/252 |
| 2003/0108027 | A1 | 6/2003 | Kim et al. |
| 2004/0092290 | A1 | 5/2004 | Arima et al. |
| 2005/0025096 | A1 | 2/2005 | Vayanos et al. |
| 2006/0142040 | A1 * | 6/2006 | Jones .................. 455/522 |

* cited by examiner

*Primary Examiner*—Nghi H Ly
(74) *Attorney, Agent, or Firm*—Volpe and Koenig, PC

(57) ABSTRACT

The present invention is related to a method and system for preventing high speed downlink packet access (HSDPA) transmission loss due to transmission gap in compressed mode in a wireless transmit/receive unit (WTRU). In accordance with one embodiment, a Node-B receives a compressed mode transmission gap schedule of a WTRU, identifies HSDPA transmission time intervals (TTIs) that are affected by the WTRU compressed mode transmission gap schedule and schedules the HSDPA transmissions not to overlap the WTRU compressed mode transmission gap schedule. In accordance with another embodiment, the Node-B may inform the HSDPA transmission schedule to a radio network controller (RNC) and the RNC coordinates the HSDPA transmission schedule and a compressed mode transmission gap schedule of the WTRU.

2 Claims, 4 Drawing Sheets

US 7,813,312 B2

METHOD AND SYSTEM FOR PREVENTING HIGH SPEED DOWNLINK PACKET ACCESS TRANSMISSIONS LOSS

CROSS REFERENCE TO RELATED APPLICATION

This application claims the benefit of U.S. provisional application No. 60/678,526, filed May 6, 2005, which is incorporated by reference as if fully set forth.

FIELD OF INVENTION

The present invention is related to a wireless communication system. More particularly, the present invention is related to a method and system for preventing wasted high speed downlink packet access (HSDPA) transmission during compressed mode transmission gaps in a wireless transmit/receive unit (WTRU).

BACKGROUND

Under Third Generation Partnership Project (3GPP) standards, a WTRU is required to monitor cells on other frequencies and on other modes and radio access technologies that are supported by the WTRU. In order to allow the WTRU to perform measurements, a network commands the WTRU to enter into compressed mode.

During transmission gaps in the compressed mode, physical data bits for the dedicated physical channels (DPCHs) are lost. However, the transport data can typically be recovered by several mechanisms: 1) interleaving across multiple frames, 2) error correction coding, and 3) mechanisms built into the standards to offset the degradation caused by lost channel bits (e.g. spreading factor (SF) reduction, puncturing, and power control in the compressed mode).

Transmission gaps in the compressed mode affect not only DPCH transmissions but also HSDPA transmissions. However, currently there is no mechanism for performance recovery of HSDPA transmissions that overlap with compressed mode transmission gaps. There is no coordination of the compressed mode transmission gap scheduling and HSDPA packet scheduling in current wireless communication standards. HSDPA packet scheduling that is done without considering the impact of compressed mode transmission gaps will result in wasted resources and diminished system capacity.

SUMMARY

The present invention is related to a method and system for preventing HSDPA transmission loss due to transmission gaps in compressed mode in a WTRU. In accordance with one embodiment, a Node-B receives a compressed mode transmission gap schedule of a WTRU, identifies HSDPA transmission time intervals (TTIs) that are affected by the WTRU compressed mode transmission gap schedule and schedules the HSDPA transmissions not to overlap the WTRU compressed mode transmission gap schedule. In accordance with another embodiment, the Node-B may inform the HSDPA transmission schedule to a radio network controller (RNC) and the RNC coordinates the HSDPA transmission schedule and a compressed mode transmission gap schedule of the WTRU.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Compressed mode in frequency division duplex (FDD) is used exclusively for inter-frequency (FDD and time division duplex (TDD)) and inter-radio access technology (RAT) (GSM) measurements in the Cell_DCH state only. Certain slots, as determined by the network, are not used for transmission, but rather the gaps are used for measurements on other frequencies. The network signals the WTRU (via radio resource control (RRC) signaling) the starting point and length of each compressed mode gap, along with the specific measurement purpose of the gap (FDD, TDD or GSM). The rate and type of compressed frames is variable and dependent on the measurement requirements. Compressed frames can occur periodically or be requested on demand. The intention of compressed mode is not to lose data, but to compress it in the time domain.

At a minimum, for WTRUs that require compressed mode in order to make these measurements (i.e., WTRUs with a single receiver architecture), the compressed mode gaps exist in the downlink (DL). Compressed mode gaps can also exist in the uplink (UL), based on the WTRU's signaled capability—some WTRUs may require UL compressed mode while making DL measurements in order to ensure that its UL transmission does not "bleed over" into the receiver, thus corrupting the measurement. GSM measurements in the 1800 MHz band is typical example of this, due to the closeness of this band to the core FDD uplink band at 1920 MHz.

Figure 1:
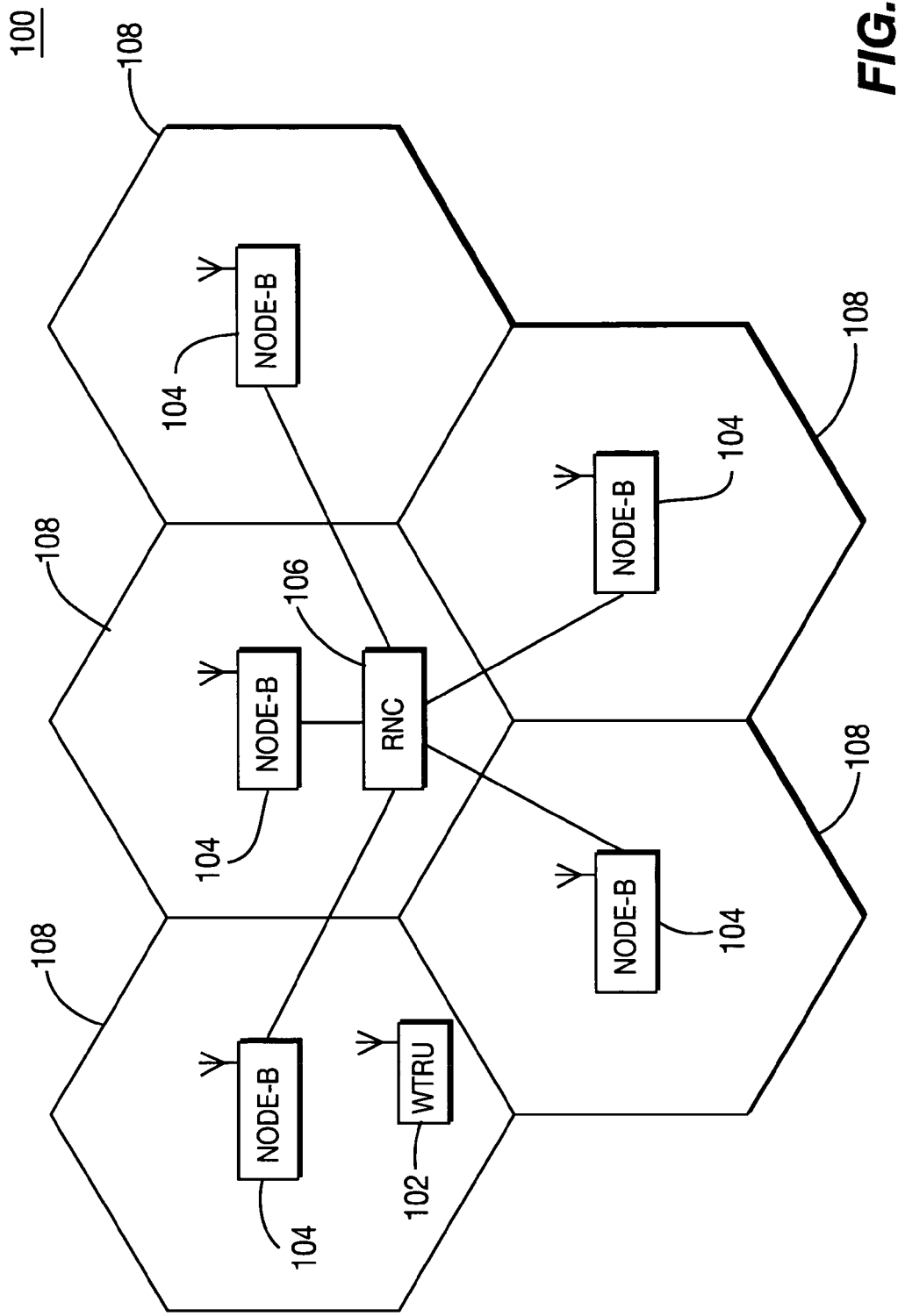
FIG. 1 is a block diagram of a wireless communication system in accordance with the present invention.

FIG. 1 is a block diagram of a wireless communication system 100 which implements the present invention. The wireless communication system comprises one or more cells 108. A cell 108 is served by a Node-B 104 and, typically, several Node-Bs 104 are controlled by an RNC 106. The wireless communication system 100 is configured to provide both regular DCH services and HSDPA services. The RNC 106 controls scheduling of transmission gaps in the compressed mode in a WTRU 102. HSDPA transmissions are scheduled by the Node-B 104. In accordance with the present invention, the RNC 106 coordinates with the Node-B 104 for scheduling transmission gaps in the compressed mode and the Node-B 104 is aware of the transmission gap scheduling of the WTRU 102. Therefore, overlapping of the HSDPA transmissions with the transmission gaps of the compressed mode in the WTRU 102 can be prevented.

Figure 2:
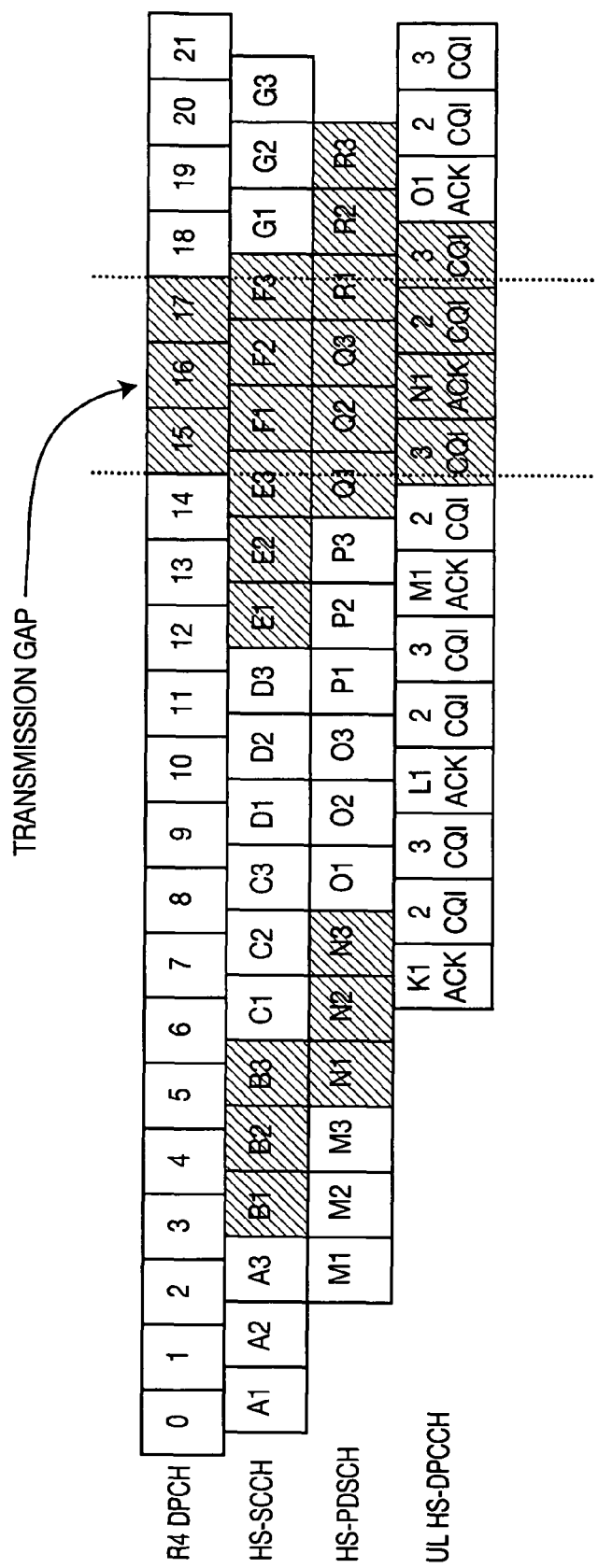
FIG. 2 is a diagram of DPCH and HSDPA transmissions that are affected by transmission gaps in a compressed mode.

FIG. 2 is a diagram of DPCH and HSDPA transmissions that are affected by transmission gaps in the compressed mode. In FIG. 2, times slots 15-17 are scheduled to be transmission gaps in the compressed mode in the WTRU 102. Therefore, the WTRU 102 will not receive or transmit via the DPCH and HSDPA channels, (i.e., high speed-shared control channel (HS-SCCH), high speed-physical downlink shared channel (HS-PDSCH) and uplink high speed-dedicated physical control channel (HS-DPCCH)), during the transmission gaps.

The shaded time slots in FIG. 2 are the times slots that are affected by the transmission gaps in the compressed mode. Time slots 15-17 in the DPCH, subframes E and F (there are three slots in each subframe labeled E1, E2, and E3 for subframe E, and F1, F2, and F3 for subframe F) in the HS-SCCH, subframes Q and R in the HS-PDSCH, and the CQI time slot preceeding N1, the ACK/NAK timeslot N1, and the two timeslots following N1 in the uplink HS-DPCCH overlap the transmission gaps of the compressed mode. Therefore, transmissions in these times slots may be lost. Under the 3GPP standards, HS-PDSCH transmissions are transmitted two (2) time slots after the associated HS-SCCH transmissions, and the uplink transmissions associated with the HS-PDSCH transmissions are transmitted 7.5 time slots after the HS-PDSCH transmissions. Therefore, transmissions in subframe B in the HS-SCCH and subframe N in the HS-PDSCH are also unnecessary, (i.e. would be wasted), since the associated uplink response in the HS-DPCCH may be lost.

In accordance with one embodiment of the present invention, the Node-B 104 is aware of compression mode transmission gap schedule of the WTRU 102. The Node-B is made aware of the transmission gap schedule via NBAP signaling from the RNC 106 to the Node-B 104.

Figure 3:
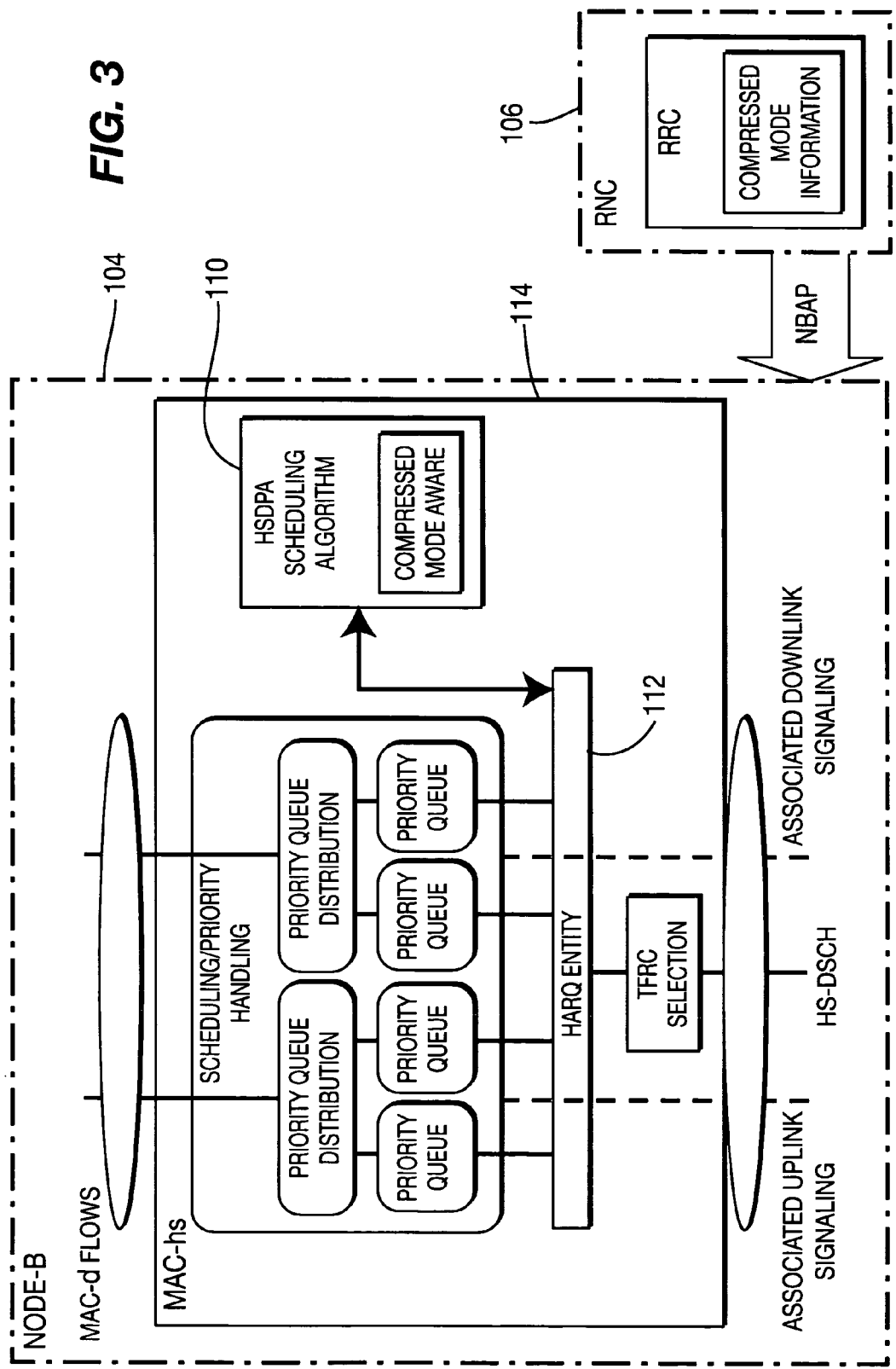
FIG. 3 is a block diagram of a Node-B in accordance with the present invention.

FIG. 3 is a block diagram of a Node-B 104, (along with an RNC 106), in accordance with the present invention. The Node-B 104 includes an HSDPA scheduler 110 which is provided with the ability to identify HSDPA transmission time intervals (TTIs) that are affected by compressed mode transmission gaps of the WTRU 102. The HSDPA scheduler 110 considers the effects of a transmission gap that intersects with the HS-DSCH TTI, the HS-SCCH period, and the corresponding acknowledge/non-acknowledge (ACK/NACK) timeslots of the uplink HS-DPCCH.

The HSDPA scheduler 110 in the Node-B 104 schedules HSDPA transmissions and controls the hybrid-automatic repeat request (H-ARQ) entity 112 in the MAC-hs entity 114 of the Node-B 104 such that WTRUs 102 are not scheduled for HS-DSCH transmissions when the transmission would be impacted by the transmission gaps in the compressed mode. The HSDPA scheduler 110 is "compressed mode aware" and there are no loss of packets due to a compressed mode. With this scheme, an efficient use of HSDPA resources and system capacity is obtained.

In the example of FIG. 2, the HSDPA scheduler 110 recognizes that the WTRU 102 is scheduled to enter a compressed mode with transmission gaps in times slots 15-17, and identifies that subframes E and F in the HS-SCCH, subframes Q and R in the HS-PDSCH, the timeslot preceding N1, the ACK/NAK timeslot N1, and the two timeslots following N1 in the uplink HS-DPCCH, subframe B in the HS-SCCH and subframe N in the HS-PDSCH would be affected by the transmission gaps. The HSDPA scheduler 110 schedules HSDPA transmissions for the WTRU 102 such that they do not overlap in these affected time slots. HSDPA transmissions to other WTRUs that are not affected by transmission gaps at that time, (since different WTRUs have transmission gaps at different times), are scheduled such that radio resources are not wasted.

In accordance with another embodiment of the present invention, in order to maintain system capacity while allowing for compressed mode operation, the scheduling of transmission gaps in a compressed mode is made dependent upon the state of the HSDPA transmissions. It is common that for the vast majority of the time, a WTRU 102 is not being scheduled for HSDPA transmissions/receptions. During these periods, no restriction on the scheduling of transmission gaps in a compressed mode needs to be imposed. However, when the WTRU 102 is actively downloading data via HSDPA channels, the HSDPA scheduler 110 in the Node-B 104 provides the HSDPA schedule to the RNC 106. The RNC 106 utilizes the HSDPA scheduling information in scheduling transmission gaps of the compressed mode at the WTRU 102 such that overlapping the transmission gaps and the HSDPA transmission schedules are avoided. This embodiment is preferably implemented in the case that the RNC and the Node-B are co-sited.

Prior to the HSDPA scheduler 110 scheduling a transmission, a request may be sent to the RNC 106 to cancel a scheduled compressed mode transmission gap which overlaps the HSDPA schedules based on high priority HSDPA traffic. The RNC 106 reschedules the transmission gap in accordance with the HSDPA transmission schedule. With this scheme, the HSDPA scheduling and the compressed mode scheduling are coordinated not to overlap each other.

Figure 4:
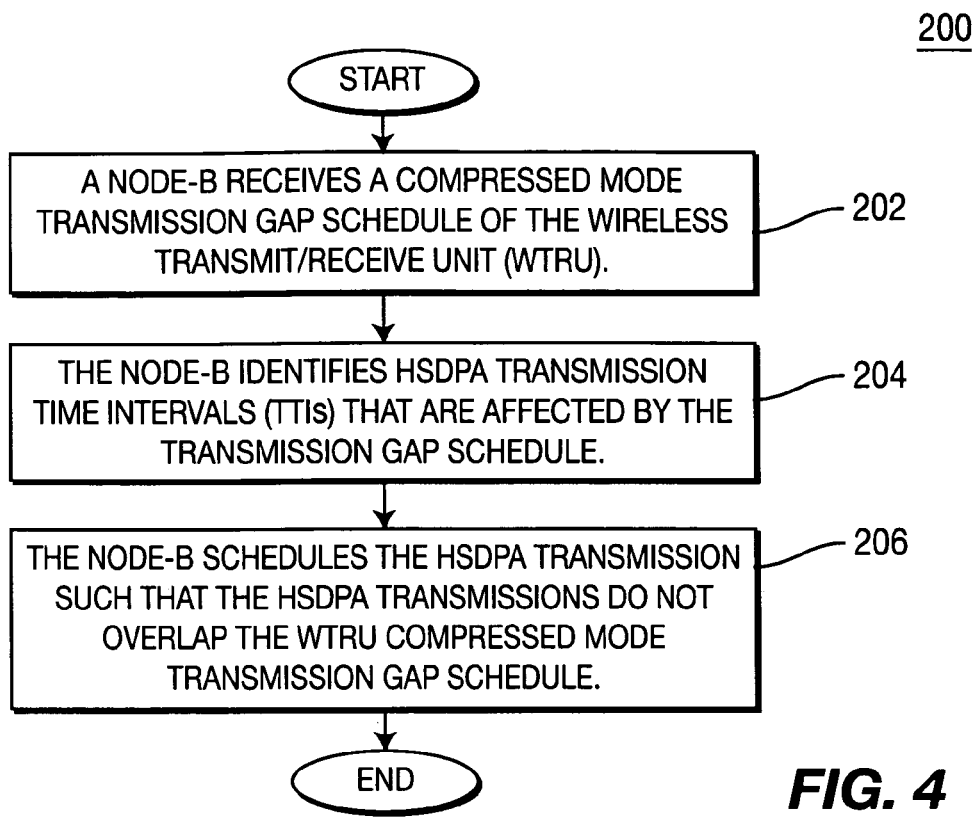
FIGS. 4 and 5 are flow diagrams of processes for preventing HSDPA transmission loss in accordance with the present invention.

FIG. 4 is a flow diagram of a process 200 for preventing HSDPA transmission loss in accordance with the first embodiment of the present invention. A Node-B 104 receives a compressed mode transmission gap schedule of the WTRU 102 from an RNC 106 (step 202). The Node-B 104 identifies HSDPA transmission time intervals (TTIs) that are affected by the transmission gap schedule (step 204). The Node-B 104 then schedules the HSDPA transmissions for the WTRU 102 such that the HSDPA transmissions do not overlap the WTRU compressed mode transmission gap schedule (step 206).

Figure 5:
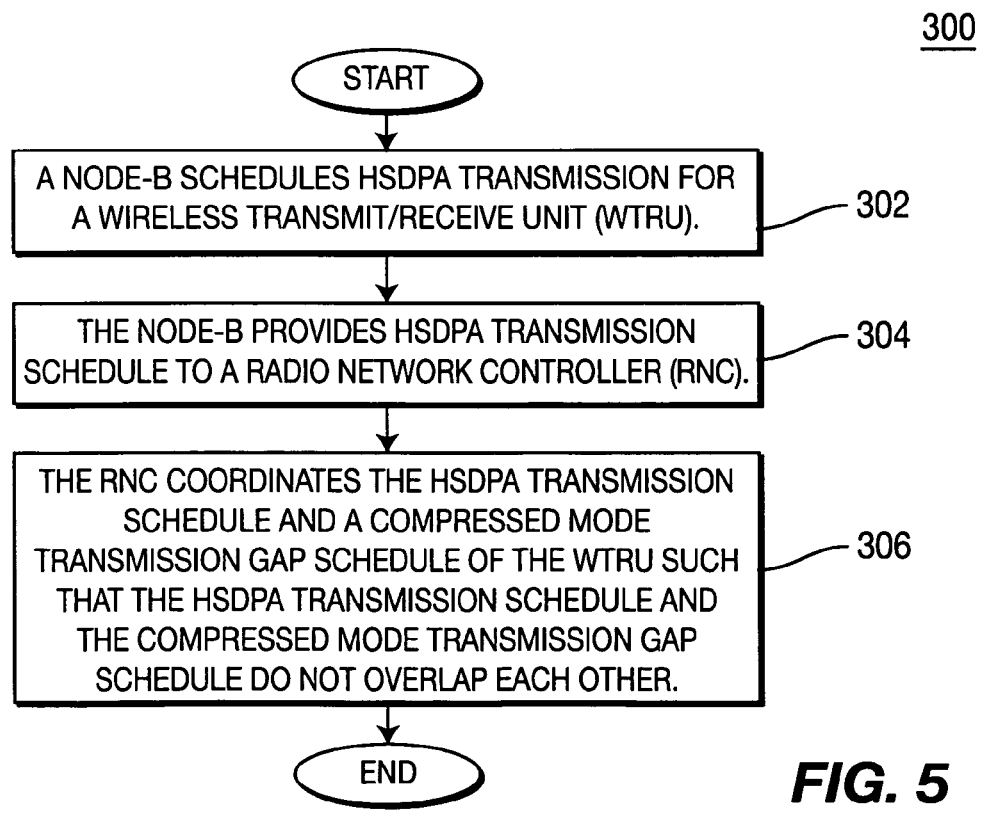

FIG. 5 is a flow diagram of a process 300 for preventing HSDPA transmission loss in accordance with the second embodiment of the present invention. A Node-B 104 schedules HSDPA transmissions for a WTRU 102 (step 302). The Node-provides B 104 provides the HSDPA transmission schedule to an RNC 106 (step 304). The RNC 106 then coordinates the HSDPA transmission schedule and a compressed mode transmission gap schedule of the WTRU 102 such that the HSDPA transmission schedule and the compressed mode transmission gap schedule do not overlap each other (step 306).

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for preventing high speed downlink packet access (HSDPA) transmission loss, the method comprising:
   a Node-B receiving a compressed mode transmission gap schedule for a wireless transmit/receive unit (WTRU);
   the Node-B identifying HSDPA transmission time intervals (TTIs) that are affected by the transmission gap schedule; and
   the Node-B scheduling HSDPA transmissions for the WTRU not to overlap the compressed mode transmission gap schedule;
   wherein the Node-B considers effects of the compressed mode transmission gap with at least one of high speed-downlink shared channel (HS-DSCH) TTI, high speed-shared control channel (HS-SCCH) TTI, and high speed-dedicated physical control channel (HS-DPCCH) TTI.

2. A Node-B for preventing high speed downlink packet access (HSDPA) transmission loss, the Node-B comprising:

an HSDPA scheduler for scheduling HSDPA transmissions, the HSDPA scheduler configured to identify HSDPA transmission time intervals (TTIs) that are affected by a compressed mode transmission gap schedule and schedule the HSDPA transmissions not to overlap a compressed mode transmission gap;

wherein the HSDPA scheduler considers effects of the compressed mode transmission gap with at least one of high speed-downlink shared channel (HS-DSCH) TTI, high speed-shared control channel (HS-SCCH) TTI, and high speed-dedicated physical control channel (HS-DPCCH) TTI.

* * * * *